United States Patent Office 2,979,486
Patented Apr. 11, 1961

2,979,486

LINEAR POLYESTERS AND PROCESS OF PREPARING THE SAME

John C. Petropoulos, Norwalk, Conn., assignor to American Cyanamid Company, New York, N.Y., a corporation of Maine No Drawing. Filed Aug. 4, 1958, Ser. No. 753,127

8 Claims. (Cl. 260—75)

This invention relates to a novel class of linear polyester resins and to the process of preparing the same. More particularly, this invention relates to a linear polyester resin prepared by esterifying a butylidene bis-benzoic acid with ethylene glycol.

One of the objects of the present invention is to produce a linear polyester resin composition by reacting a butylidene bis-benzoic acid with ethylene glycol. A further object of the present invention is to produce a linear polyester resin film from a butylidene bis-benzoic acid and ethylene glycol. A further object of the present invention is to produce a linear polyester fiber from the novel polyester resin compositions of the present invention. These and other objects of the present invention will be discussed in greater detail hereinbelow.

The present application is a continuation-in-part of my earlier application having the Serial No. 523,355, filed July 20, 1955, now U.S. Patent No. 2,848,486, issued August 19, 1958.

In the preparation of the polyester resin compositions of the present invention, one may react the dibenzoic acid with the ethylene glycol in equimolecular proportions or in proportions in which the ethylene glycol is substantially in excess of the amount required to completely esterify the dibenzoic acid. If one uses equimolecular proportions of the acid and the alcohol, a comparatively low molecular weight polyester resin will result. The molecular weight of such a polyester resin would be in the order of magnitude of about 5,000 to 8,000 as determined by end group analysis, micro isopiestic techniques or a vapor pressure method. Polyester resins can be prepared by reacting these bis-benzoic acids with ethylene glycol having molecular weights as high as 50,000 or even 75,000 or higher if the mechanical equipment to handle such viscous polyesters is available. The molecular weight determinations on these higher polyester resins can be ascertained using the osmotic pressure technique or light scattering methods or intrinsic viscosity determinations. These techniques for molecular weight determinations are described in considerable detail in "Principles of Polymer Chemistry," P. J. Flory, Cornell University Press, 1953, and particularly on pages 317–334, inclusive. To produce very high molecular weight polyester resins, substantial excesses of ethylene glycol should be used over and beyond the total stoichiometrical quantity calculated to esterify completely the butylidene bis-benzoic acids. In this type of reaction, one insures the formation of the dihydroxy ethyl ester of the butylidene dibenzoic acid followed by transesterification in which the ethylene glycol once attached to the dibenzoic acid is removed in part and a linear polyester resin results. To accomplish this, one would use about 6 mols of ethylene glycol per mol of the butylidene dibenzoic acid. Such a mol ratio would give a 4 mol excess of ethylene glycol. To produce such a diester, one would charge 6 mols of the ethylene glycol and 1 mol of the butylidene dibenzoic acid to a suitable reaction vessel equipped with thermometer, stirrer and reflux condenser and heat until an acid number of less than 0.5 is achieved. Thereupon, the excess ethylene glycol is stripped off in an atmospheric distillation whereupon a transesterification catalyst may be introduced and the heating continued removing all or substantially all of the ethylene glycol split off in the course of the condensation. When the ethylene glycol being derived from the system becomes very slight, a vacuum may be applied to extract the last traces of free ethylene glycol present in the system. A vacuum of less than 2 millimeters of mercury will suffice for this purpose.

An alternative method for making the polyester resins of the present invention resides in making first the diakyl ester of the butylidene dibenzoic acid and reacting said diester in the presence of an excess of ethylene glycol until the monohydric alcohol is substantially completely removed. At this point, the dihydroxy ethyl ester of the butylidene dibenzoic acid is produced and by using a transesterification catalyst, the polyester resin can be prepared in much the same manner as is outlined hereinabove.

Among the butylidene dibenzoic acids which may be used in the practice of the process of the present invention are 4,4'-(2,2-butylidene)dibenzoic acid; 3,3'-(2,2-butylidene)dibenzoic acid; 2,2'-(2,2-butylidene)dibenzoic acid, and the like.

The polyester resin compositions of the present invention may be used to produce molded articles in either a compression molding operation or an injection molding operation or these novel polyester resin compositions may be used to produce monofilaments by extruding the viscous polyester resin compositions through orifices of a selected diameter to produce said monofilamentary fibers of a chosen cross-sectional size. One may produce additionally self-supporting films of any desired thickness including those used for packaging purposes or other sheeting uses. In this latter operation, the polyester resin compositions of the present invention are calendered on heated rolls and the films withdrawn therefrom. If it is desired to have exceedingly flexible films, the polyester resin compositions may be plasticized with conventional amounts of the known film plasticizers such as dibutyl phthalate and dioctyl phthalate, and the like.

In preparing the polyester resins of the present invention by reacting the butylidene acids with ethylene glycol, the initial esterification reaction may be carried out at any temperature between about 100° C. and reflux. Preferably, one would use temperatures between about 160° C. and 205° C. After the dihydroxy ethyl ester is produced and the excess ethylene glycol stripped off, one may introduce the transesterification catalyst and heat at a temperature between about 220° C. and 290° C. and preferably at a temperature between about 250° C. and 275° C.

Mention has been made hereinabove of the use of conventional transesterification catalysts of which a plurality are well known in the art. Attention is directed to the U.S. Patents Nos. 2,641,592; 2,650,213; 2,711,402; 2,720,502; 2,729,619; 2,739,957, and 2,808,390.

In order that the present invention may be more completely understood, the following examples are set forth in which all parts are parts by weight unless otherwise indicated. These examples are set forth primarily for the purpose of illustration, and any specific enumeration of detail contained therein should not be interpreted as a limitation on the case except as is indicated in the appended claims.

EXAMPLE 1

Into a suitable reaction vessel equipped with stirrer, thermometer, gas inlet and outlet tubes and a steam-jacketed condenser, there is introduced 149 parts of 4,4'-(2,2-butylidene)dibenzoic acid and 186 parts of ethylene glycol. The charge is heated to about 190° C. with constant stirring while bubbling nitrogen through the reaction mixture. The charge is held at about 195–205° C. for about 21 hours until an acid number of less than 0.5 is reached. At this point, 0.3% by weight of zinc acetate and 0.03% of antimony trioxide are added and the reaction vessel is transferred to a molten Wood's metal bath and held at about 255–265° C. The ethylene glycol excess is distilled off and when the rate of distillation slows down, a vacuum of less than 1 mm. of mercury is applied and the temperature of the bath is raised to about 270° C. This reaction time is about 9 hours and the intrinsic viscosity of the resulting polyester in benzene (dl./g.) is 0.32.

EXAMPLE 2

Example 1 is repeated in every detail except that in the place of the zinc acetate and the antimony trioxide catalyst, there is used 0.05% of tetraisopropyl titanate. The reaction time is 7 hours and the intrinsic viscosity is 0.34.

EXAMPLE 3

Example 2 is repeated in every detail except that the time of reaction is 16 hours and the intrinsic viscosity is 0.55. The following table illustrates the properties of the resulting polyester resins of Examples 2 and 3.

Table I

| Properties | Ex. 2 | Ex. 3 |
| --- | --- | --- |
| Intrinsic Viscosity (benzene) dl./g | 0.34 | 0.55 |
| Heat Distortion, 264 p.s.i., ° C | 101 | 103 |
| Notched Izod Impact, ft. lb./in | 0.47 | 0.54 |
| Flexural Strength, lb./sq. in | 17,600 | 17,500 |
| Flexural Modulus×10⁻⁶, lb./sq. in | 0.39 | 0.40 |
| Tensile Strength, lb./sq. in | 7,800 | 8,700 |
| Elongation, Percent | 3.6 | 5.2 |
| Density | 1.21 | 1.21 |

The following table illustrates the chemical resistance properties of the polyester resin of Example 2.

Table II

CHEMICAL RESISTANCE OF POLYESTER RESIN OF EXAMPLE 2 (7 DAYS IN LISTED CHEMICALS AT 23° C.)

| Deionized Water | 0.22% gain | no change in appearance. |
| --- | --- | --- |
| 10% NaCl | 0.20% gain | Do. |
| 30% $H_2SO_4$ | 0.18% gain | Do. |
| 95% Ethanol | 0.12% gain | Do. |
| 10% NaOH | 0.18% gain | Do. |

The following table illustrates the electrical properties of the polyester resin of Example 2.

Table III

| Frequency, c.p.s. | Dielectric Constant | Dissipation Factor |
| --- | --- | --- |
| 60 | 3.28 | 0.0017 |
| $10^3$ | 3.28 | 0.0038 |
| $10^4$ | 3.25 | 0.0105 |
| $10^5$ | 3.15 | 0.0200 |
| $10^6$ | 3.06 | 0.0229 |

EXAMPLE 4

Into a suitable reaction vessel equipped as in Example 1, there is introduced 223.2 parts of ethylene glycol and 195.6 parts of the dimethyl ester of 4,4'-(2,2-butylidene)-dibenzoic acid. There is added 6.58 parts of zinc acetate and nitrogen is bubbled through the reaction mixture. The charge is heated to about 140–160° C. and at the upper temperature methanol started to evolve. The temperature is allowed to rise slowly to 205° C. as the methanol is distilled off. The reaction is continued at about this temperature for 18 hours to insure the substantially complete removal of the methanol. The excess glycol is distilled off at atmospheric pressure under nitrogen to a pot temperature of about 250° C. Thereupon, 6 parts of antimony trioxide are added and a vacuum of 0.5 mm. of mercury applied. After 9 hours at 265–275° C., a polymer was formed with an intrinsic viscosity of 0.35 dl./g. (benzene). The properties of the polyester resin prepared according to the instant example were almost identical with the properties of the polyester resin prepared according to Example 2.

The arts of making films and fibers from linear polyester resin compositions is so well known that it is deemed to be unnecessary to engage in any delineation of such arts with respect to the novel linear polyester resin compositions of the present invention.

I claim:

1. A polyester resin resulting from the reaction of from about 1 to 6 mols of ethylene glycol and an unsubstituted butylidene bis benzoic acid to an acid number of less than 0.5 and having an intrinsic viscosity between 0.32 and 0.55 in benzene.

2. A polyester resin resulting from the reaction of from about 1 to 6 mols of ethylene glycol and 4,4'-(2,2-butylidene) dibenzoic acid to an acid number of less than 0.5 and having an intrinsic viscosity between 0.32 and 0.55 in benzene.

3. A polyester resin film resulting from the reaction of from about 1 to 6 mols of ethylene glycol and an unsubstituted butylidene bis benzoic acid to an acid number of less than 0.5 and having an intrinsic viscosity between 0.32 and 0.55 in benzene.

4. A polyester resin film resulting from the reaction of from about 1 to 6 mols of ethylene glycol and 4,4'-(2,2-butylidene) dibenzoic acid to an acid number of less than 0.5 and having an intrinsic viscosity between 0.32 and 0.55 in benzene.

5. A polyester resin fiber resulting from the reaction of from about 1 to 6 mols of ethylene glycol and an unsubstituted butylidene bis benzoic acid to an acid number of less than 0.5 and having an intrinsic viscosity between 0.32 and 0.55 in benzene.

6. A polyester resin fiber resulting from the reaction of from about 1 to 6 mols of ethylene glycol and 4,4'-(2,2-butylidene) dibenzoic acid to an acid number of less than 0.5 and having an intrinsic viscosity between 0.32 and 0.55 in benzene.

7. A process comprising esterifying, by heating at a temperature between about 100° C. and reflux, an unsubstituted butylidene bis benzoic acid with from about 1 to 6 mols of ethylene glycol per mol of said acid until an acid number of less than 0.5 is achieved, the resulting polyester resin having an intrinsic viscosity between about 0.32 and 0.55 in benzene.

8. A process comprising esterifying, by heating at a temperature between about 100° C. and reflux, 4,4'-(2,2-butylidene)dibenzoic acid with from about 1 to 6 mols of ethylene glycol per mol of said acid until an acid number of less than 0.5 is achieved, the resulting polyester resin having an intrinsic viscosity between about 0.32 and 0.55 in benzene.

References Cited in the file of this patent

UNITED STATES PATENTS

| 2,720,505 | Caldwell | Oct. 11, 1955 |
| --- | --- | --- |
| 2,794,822 | Schweitzer | June 4, 1957 |